Figure 1:
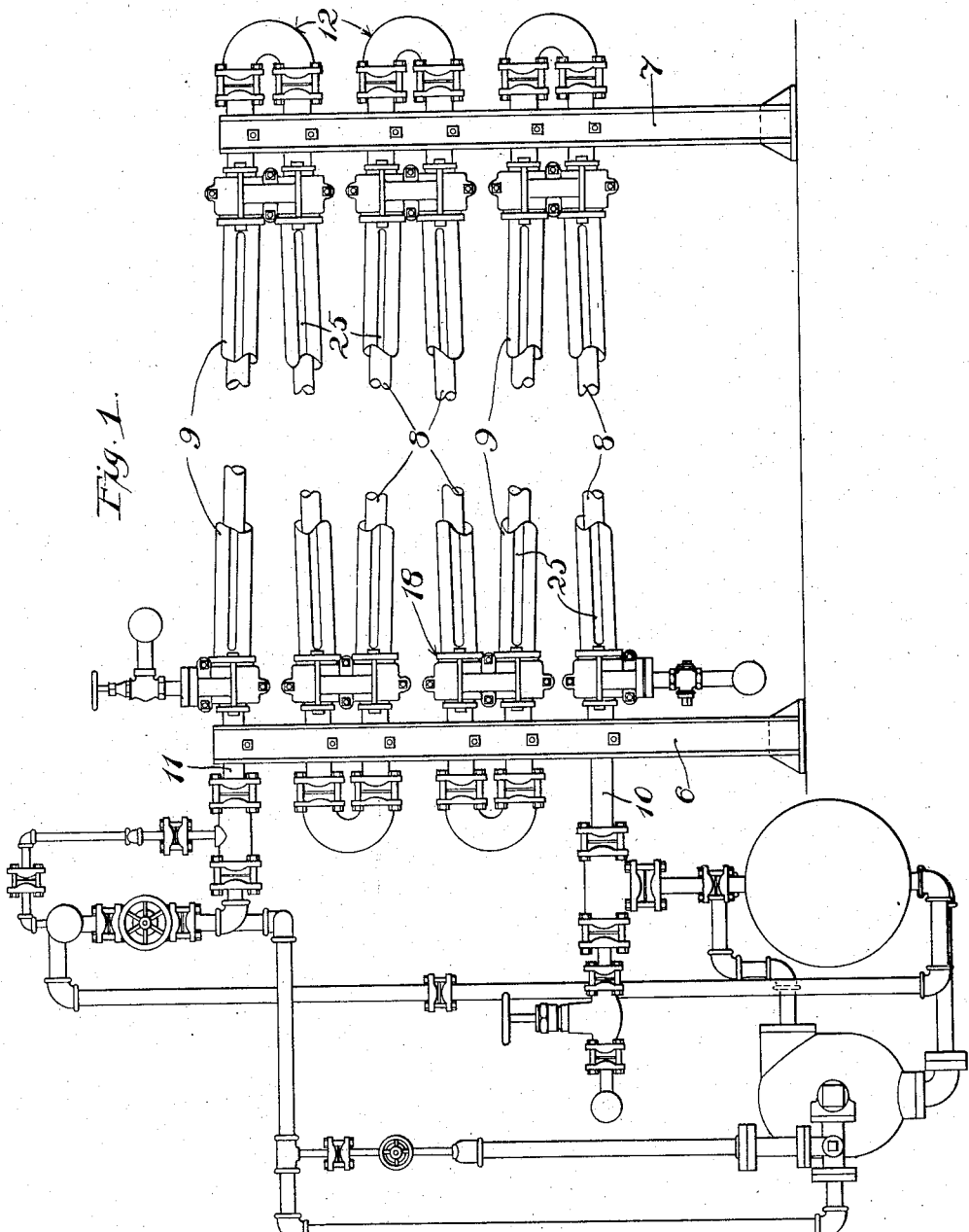

C. W. VOGT.
DOUBLE PIPE HEAT EXCHANGER.
APPLICATION FILED MAY 29, 1915.

1,197,976.

Patented Sept. 12, 1916.
2 SHEETS—SHEET 2.

Witness
H. S. Gaither

Inventor
Clarence W. Vogt
by Banning & Banning
Att'ys.

UNITED STATES PATENT OFFICE.

CLARENCE W. VOGT, OF LOUISVILLE, KENTUCKY.

DOUBLE-PIPE HEAT-EXCHANGER.

1,197,976.  Specification of Letters Patent.  Patented Sept. 12, 1916.

Application filed May 29, 1915. Serial No. 31,197.

*To all whom it may concern:*

Be it known that I, CLARENCE W. VOGT, a citizen of the United States, residing at Louisville, in the county of Jefferson and State of Kentucky, have invented certain new and useful Improvements in Double-Pipe Heat-Exchangers, of which the following is a specification.

The present invention has reference to certain improvements in double pipe heat exchangers, that is machines whose function and object is to transfer heat from one medium to another by a double pipe construction.

The features of the invention are adapted for use in condensers, cooling machines, ammonia absorbers, and in many other types of machine, wherein heat is to be exchanged from one medium to another. I do not limit myself to the use of the features of invention to any particular type of such machine, but for purposes of convenience I have shown the features of invention as used in an ammonia absorber. Furthermore for a similar reason I have shown the features of invention as used in my patent for improvements in ammonia absorbers No. 1,149,005, dated Aug. 3, 1915. It will therefore be understood that where in the specification and claims I make reference to an ammonia absorber, that is done as a matter of convenience in description, and that the features of invention are equally applicable to other types of construction, and that I do not limit myself to their use in ammonia absorbers, except as I may do so in the claims. In the construction shown in the aforementioned previously filed application the pipes of the absorber are shown as being cooled by a stream of water which is allowed to trickle down over the outside surface of the pipes from the top to the bottom of the stack. In the present case I have provided a water jacket around each of the pipes and the features of the present invention have particular reference to these water jackets and to their construction and features associated therewith.

It is a fact that when the ammonia gas is absorbed into the water the temperature of the latter rises, and the rise of temperature will very largely depend upon the amount of ammonia gas absorbed into each unit of volume of water. Under ordinary circumstances where a liquor of considerable saturation is being produced the rise of temperature will be quite large. The ability of the water to absorb ammonia gas decreases as the temperature of the liquor rises, cold water being able to absorb a very much larger proportion of the gas than the warm or hot water. Therefore where it is desired to make the liquor in fairly concentrated form it is desirable also to keep down the temperature of the water to as low a point as possible.

The water used for the jacket will ordinarily be taken from an ordinary source of water supply, and if this water contains any of the lime compounds in solution the latter will be deposited on the pipes if the temperature rises to the necessary amount. These minerals, when deposited, are apt to cake and form a very hard crust. This action takes place by reason of the expulsion of the carbon dioxid from the solution, causing the precipitation of the lime salts. These salts are insoluble except in the presence of carbon dioxid in solution, therefore they can only be removed from the pipes by scraping.

One of the objects of the present invention is to so construct the water jacket on each of the exchanger pipes that the mineral deposit can be scraped loose whenever desired by merely rotating one of the pipes so as to cause a scraping action on the exchanger pipe, thereby freeing the mineral deposit from the same, and permitting the mineral to be carried off in suspension by the stream of water flowing through the jacket. By this arrangement the provision of special scraping devices is eliminated and the removal of the deposit is effectuated with a very simple construction in an extremely simple manner.

Another feature of the invention has reference to the construction of the attachments whereby the jacket pipes are held in position around the exchanger pipes, and whereby the jacket water is transferred from the jacket of one exchanger pipe to that of the next succeeding exchanger pipe.

Other objects and uses will appear from a detailed description of the invention which consists in the features of construction and combinations of parts hereinafter described and claimed.

Figure 2:
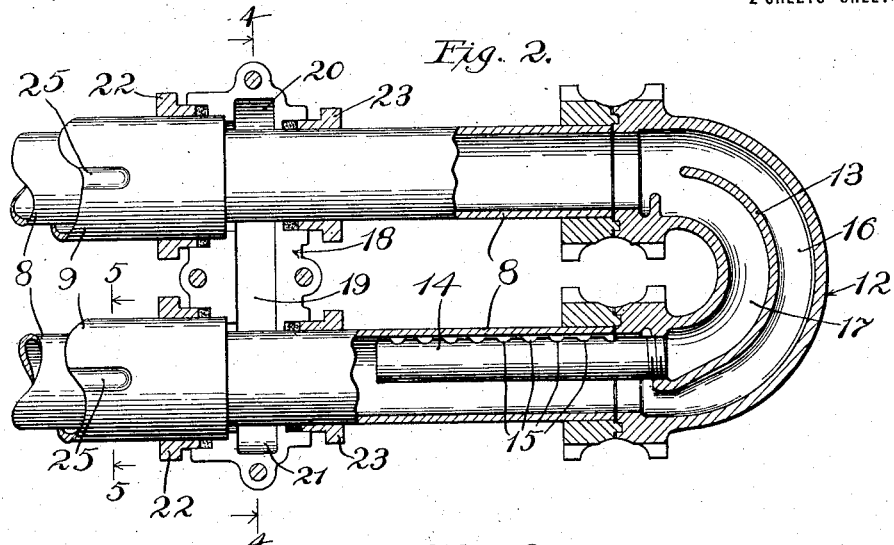
Figure 3:
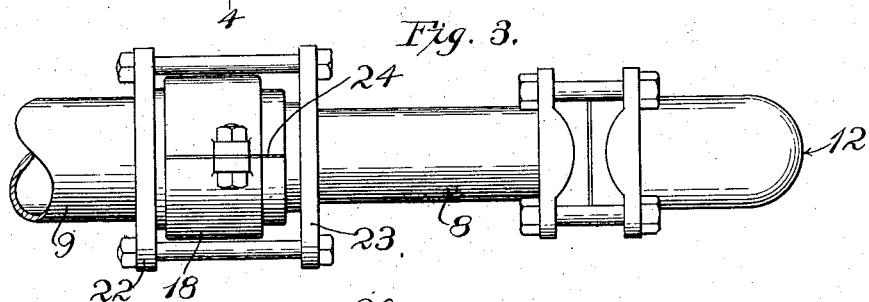
Figure 4:
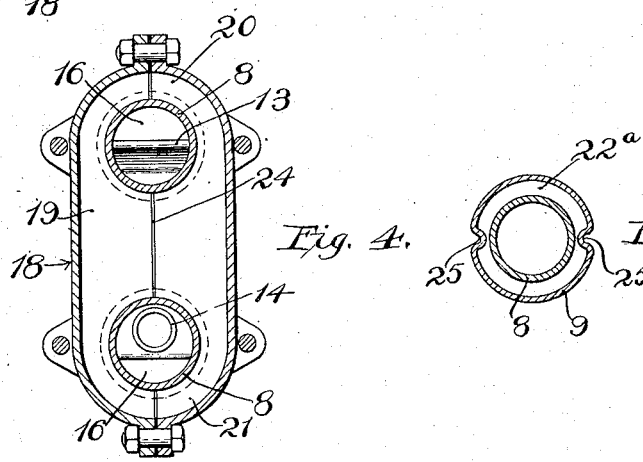
Figure 5:
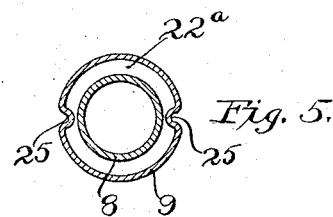

Referring to the drawings: Figure 1 shows a side elevation of an exchanger embodying the features of the present invention, the central portions of the exchanger and jacket pipes being broken away for the purpose of shortening up the figure; Fig. 2 is a vertical section through the end portions of the exchanger and jacket pipes, and through the H connection which establishes communication between the ends of successive exchanger pipes; Fig. 3 is a plan view corresponding to Fig. 2; Fig. 4 is a section taken on the line 4—4 of Fig. 2 looking in the direction of the arrows; and Fig. 5 is a section taken on the line 5—5 of Fig. 2 looking in the direction of the arrows.

Referring more particularly to Fig. 1, the exchanger is illustrated as being carried by the end racks 6 and 7, respectively. The exchanger pipes are designated by the numerals 8 and the jacket pipes by the numerals 9. The ammonia gas enters the lowermost exchanger pipe at the point 10 and flows back and forth through the various exchanger pipes upward toward the upper end 11. On the other hand, the water which is used to absorb the gas for the production of the liquor flows downwardly back and forth through the successive pipes from the end 11 toward the end 10 so that the absorption of the gas into the liquor is by means of a counter current flow. The adjacent end portions of consecutive exchanger pipes are connected together by fittings 12, the construction of which is best shown in Fig. 2. Each of these fittings has a partition 13 which gathers the liquor from the lower portion of the upper pipe and delivers it to a spray tube 14 in the upper portion of the lower pipe, from which spray tube the liquor sprays down into the body of the lower pipe through the openings 15. The gas flows upwardly in the outer passage 16 of the fitting 12 while the liquor flows downwardly through the inner passage 17 of said fitting. The features of construction thus broadly described are disclosed in the aforementioned Patent No. 1,149,005.

Each of the jacket pipes 9 surrounds its exchanger pipe and extends along the greater portion of the length thereof. Each jacket pipe has its end portions supported in the vertical H connections 18. Each of these H connections is made of two sections, as best shown in Fig. 4, which sections are companions and together constitute a complete fitting. Each fitting, as thus constituted, has a vertical passage 19 which communicates with the semi-circular upper and lower passages 20 and 21. These semi-circular passages in conjunction with the vertical passage 19 provide a passage completely surrounding each tube, both of said passages being joined together or in communication. Each jacket tube is of somewhat greater size than its exchanger tube so that a jacket passage 22$^a$ extends along between the tubes. Each exchanger tube has its end portions mounted in the corresponding H connections so that the jacket passages 22$^a$ communicate with the semi-circular and vertical passages 19, 20 and 21. Each H connection has a packing ring 22 surrounding each jacket pipe and a packing ring 23 surrounding each exchanger pipe so that the connections are rendered water tight. Also packing 24 may be inserted between the edge portions of the sections of each H connection so as to bring said sections into water and gas tight relationship.

Each jacket pipe is provided with one or more elongated scrapers which act on the outer surface of the corresponding exchanger pipe so that by rotation of the jacket pipe while the exchanger pipe remains stationary the deposit will be scraped off into the water jacket. As a convenient form of construction of this feature I have shown each jacket pipe as provided with the inwardly extending depressions 25, best shown in Fig. 5, this form of construction being such that the scrapers are integral with the jacket pipes. However, it is manifest that the scrapers might be connected to or supported on the jacket pipes in any desired manner. When it is desired to free the deposit from the exchanger pipes it is only necessary to rotate the jacket pipes, and for this purpose the packing rings 22 may be loosened up if necessary. After the deposit has been freed it will be carried off by the stream of jacket water. Thus by rotating the jacket pipes, one or more times, as frequently as desired, the exchanger pipes may be kept entirely free of deposit so as to keep the efficiency and effectiveness of the exchanger at the maximum point at all times.

While I have herein shown and described only a single form of construction embodying the features of my invention, still I do not limit myself to said construction, except as I may do so in the claims.

I claim:

1. In a device of the class described the combination with a plurality of exchanger pipes of a jacket pipe surrounding each exchanger pipe, fittings in which the end portions of the jacket pipes are journaled to permit rotation of said pipes with respect to the corresponding exchanger pipes, and projections on the jacket pipes extending inwardly toward the outer surfaces of the exchanger pipes.

2. In a device of the class described the combination with an exchanger pipe, of a jacket pipe surrounding the same, journals in which said pipe is mounted to permit rotation of said pipe with respect to the exchanger pipe, and a projection on the jacket pipe extending inwardly toward the outer surface of the exchanger pipe for the removal of deposit from the outer surface of the exchanger pipe when the jacket pipe is rotated.

CLARENCE W. VOGT.

Witnesses:
 MASON E. KLINE,
 ARCH M. RICE.

Copies of this patent may be obtained for five cents each, by addressing the "Commissioner of Patents, Washington, D. C."